United States Patent
Patterson et al.

(10) Patent No.: US 8,049,451 B2
(45) Date of Patent: Nov. 1, 2011

(54) EMBEDDED NON-CONTACT DETECTION SYSTEM

(75) Inventors: Derek L. Patterson, Shelby Township, MI (US); Scott A. Niemiec, West Bloomfield, MI (US); Craig A. Kollar, Sterling Heights, MI (US); Edward M. Sanocki, Jr., Clawson, MI (US); Thomas A. Wilson, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 649 days.

(21) Appl. No.: 12/051,636

(22) Filed: Mar. 19, 2008

(65) Prior Publication Data

US 2009/0235588 A1 Sep. 24, 2009

(51) Int. Cl.
*H02P 7/00* (2006.01)

(52) U.S. Cl. ........ 318/466; 318/467; 318/468; 318/264; 318/282

(58) Field of Classification Search .......... 318/466, 318/467, 468, 469, 264, 265, 266, 282, 286; 49/26, 27, 28
See application file for complete search history.

(56) References Cited

U.S. PATENT DOCUMENTS

| | | | | |
|---|---|---|---|---|
| 4,410,843 A * | 10/1983 | Sauer et al. | ............ | 318/467 |
| 4,458,445 A | 7/1984 | Sauer et al. | | |
| 5,448,856 A * | 9/1995 | Moore et al. | ............ | 49/340 |
| 5,959,457 A * | 9/1999 | Berberich | ............ | 324/710 |
| 6,084,417 A * | 7/2000 | Berberich | ............ | 324/711 |
| 6,094,981 A * | 8/2000 | Hochstein | ............ | 73/170.17 |
| 6,297,605 B1 * | 10/2001 | Butler et al. | ............ | 318/466 |
| 6,377,009 B1 * | 4/2002 | Philipp | ............ | 318/468 |
| 6,723,933 B2 * | 4/2004 | Haag et al. | ............ | 200/61.42 |
| 6,972,575 B2 * | 12/2005 | Lambert et al. | ............ | 324/658 |
| 7,319,301 B2 * | 1/2008 | Pribisic | ............ | 318/468 |
| 2005/0012484 A1* | 1/2005 | Gifford et al. | ............ | 318/466 |
| 2009/0000196 A1* | 1/2009 | Kollar et al. | ............ | 49/28 |
| 2009/0044449 A1 | 2/2009 | Appel et al. | | |

FOREIGN PATENT DOCUMENTS

| | | |
|---|---|---|
| DE | 3111696 A1 | 10/1982 |
| DE | 102004063512 A1 | 7/2006 |
| DE | 102006009998 A1 | 9/2007 |
| FR | 2904353 A1 | 2/2008 |
| JP | 2006316489 A * | 11/2006 |

OTHER PUBLICATIONS

German Office Action, dated Aug. 1, 2011, for German Patent Application No. 10 2009 012 889.1.

* cited by examiner

*Primary Examiner* — Walter Benson
*Assistant Examiner* — Thai Dinh
(74) *Attorney, Agent, or Firm* — Ingrassia Fisher & Lorenz, P.C.

(57) ABSTRACT

Methods and apparatus are provided for a near field detection system. The apparatus comprises a glass plate, the glass plate having a first edge and comprising a first electrode, the first electrode disposed along the first edge of the glass plate, adapted to detect the presence of an object in near proximity to the glass plate, and adapted to transmit a signal in response to the presence of the object.

16 Claims, 4 Drawing Sheets

EMBEDDED NON-CONTACT DETECTION SYSTEM

TECHNICAL FIELD

The subject matter described herein generally relates to object detection systems, and more particularly relates to near field and capacitive detection systems.

BACKGROUND

Some vehicles can offer as a feature a lift gate that can be opened and closed either manually or through powered operation by the control system.

As with any closing portal, it is possible for an object to interpose itself between the lift gate and the frame surrounding the lift gate. It would be desirable to detect such an object to reduce the likelihood that a lift gate will impact the object during its closing. Some methods of detecting objects within the range of motion of the lift gate can involve pressure switches or sensors, contact switches or sensors, and the like. Such devices typically require contact, or forceful contact with the switch or sensor to detect the presence of an obstacle. Additionally, it is necessary to position such devices at various locations in, on, or near the lift gate or lift gate frame. Thus, at least some portion of the vehicle may be is adapted to house and operate them. Such an assembly adds to the complexity of design and density of components, sometimes increasing the cost of design and/or manufacture.

BRIEF SUMMARY

An apparatus is provided for a near-field detection system. The apparatus comprises a glass plate, the glass plate having a first edge and comprising a first electrode, the first electrode disposed along the first edge of the glass plate, adapted to detect the presence of an object in near proximity to the glass plate, and adapted to transmit a signal in response to the presence of the object.

A method is provided for lowering a lift gate comprising a glass plate. The method comprises providing electrical power to a plurality of near-field sensors integrally formed with the glass plate, detecting an object with the plurality of near-field sensors, and adjusting movement of the lift gate in response to the detection of the object.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

DESCRIPTION OF THE DRAWINGS

At least one embodiment will hereinafter be described in conjunction with the following drawing figures, wherein like numerals denote like elements.

DESCRIPTION OF AN EXEMPLARY EMBODIMENT

The following detailed description is merely exemplary in nature and is not intended to limit applications or uses of the subject matter. Furthermore, there is no intention to be bound by any expressed or implied theory presented in the preceding technical field, background, brief summary or the following detailed description.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component, such as a control system, may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments may be practiced in conjunction with any number of data transmission protocols and that the system described herein merely illustrates one suitable example.

For the sake of brevity, conventional techniques related to near field detection, control systems operation, automotive operation, powered glass operation, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the subject matter.

"Connected/Coupled"—The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematic shown in FIG. 3 depicts one example arrangement of elements, additional intervening elements, devices, features, or components may be present in an embodiment of the depicted subject matter.

Figure 1:
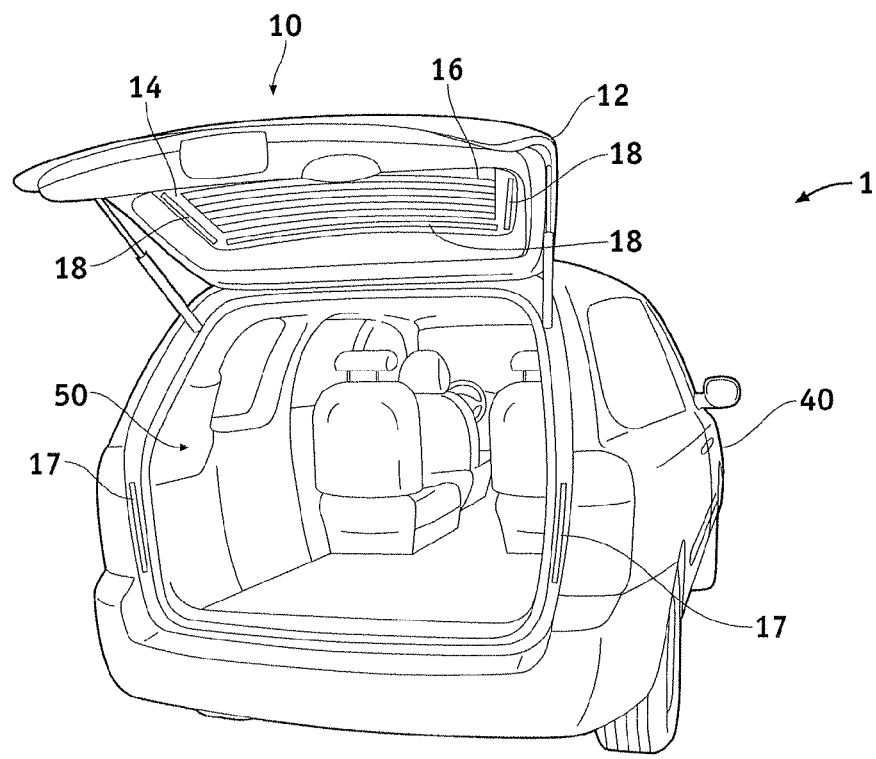
FIG. 1 is an isometric view of a vehicle comprising a near-field detection system corresponding to one embodiment.
Figure 2:
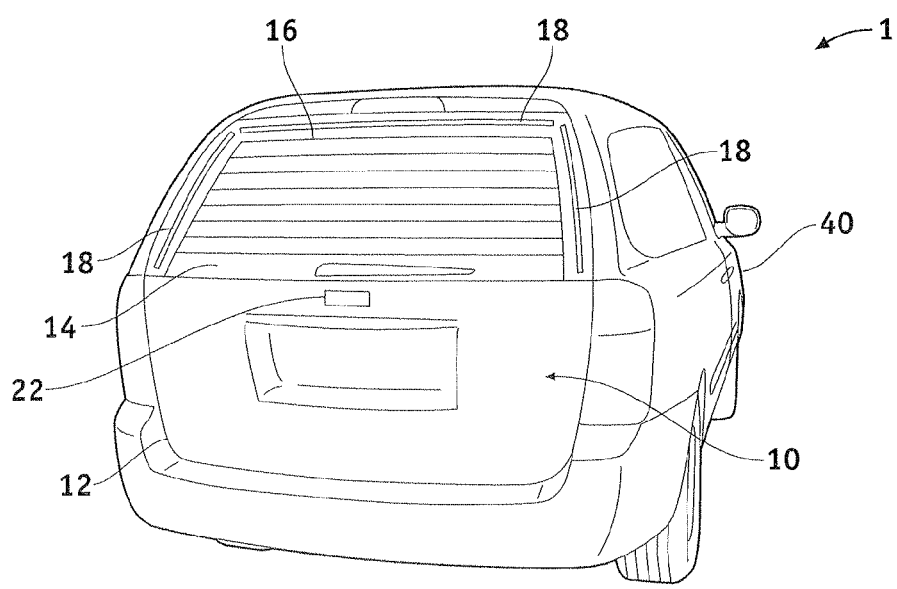
FIG. 2 is an isometric view of the vehicle of FIG. 1 in another state.

FIGS. 1 and 2 illustrate a vehicle 1 comprising a powered lift gate 10. FIG. 1 depicts the lift gate 10 in an open position. FIG. 2 depicts the lift gate 10 in a closed position. The lift gate 10 can be selectively raised or lowered. When raised, access is permitted to the interior of the vehicle 1 through the lift entrance 50. When lowered, the lift gate 10 can be coupled or latched to the vehicle body 40, closing the lift entrance 50 to the vehicle 1. The lift gate 10 can comprise a glass plate 14 to permit viewing through the lift gate 10. To inhibit the movement of the lift gate 10 when one or more objects obstruct the path of the lift gate 10, near field electrodes 18 can be disposed in, on, or near the glass plate 14 or vehicle body, to provide for object detection. Additionally, body sensors 17 can be disposed on or near the lift entrance 50.

The lift gate 10 can occupy a range of positions between the open and closed positions and can be coupled to move smoothly through the range of positions. The lift gate 10 can have a frame 12 coupled to the vehicle body 40. Various auxiliary components, such as hydraulic pistons or other position maintainer/modifiers can comprise the coupling. The lift gate 10 can be manually opened, and, in some embodiments, opened electronically.

Figure 3:
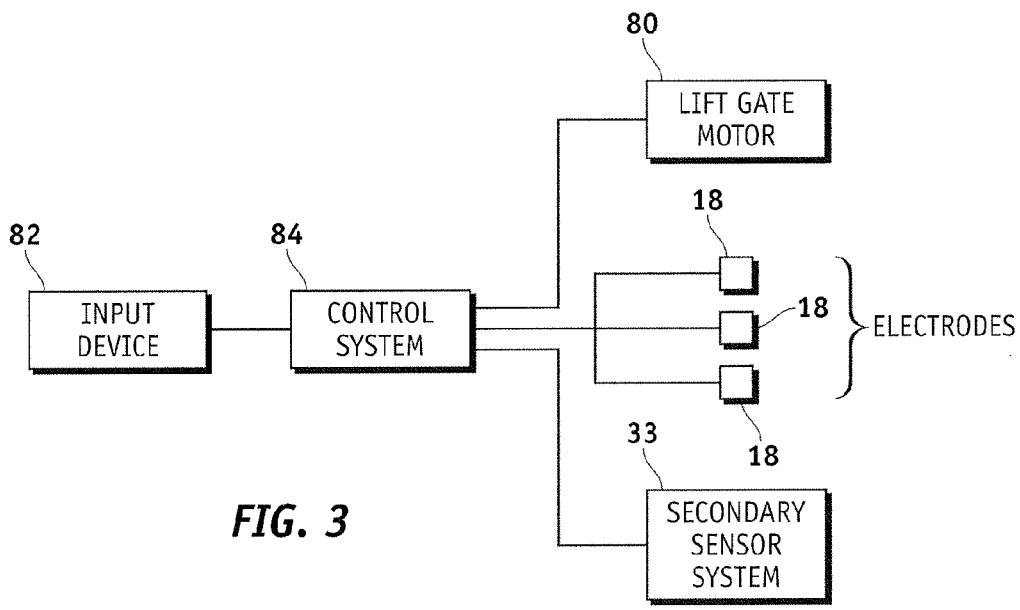
FIG. 3 is a schematic illustration of a portion of a control system suitable for use in the vehicle of FIG. 1.

With additional reference to FIG. 3, in some embodiments, the lift gate 10 can be positioned by a lift gate motor 80 coupled to the lift gate 10. The lift gate 10 can be positioned or operated to open and close through the use of an input device 82. In some embodiments, an input device 82 can be coupled to a control system 84. The control system 84 can be configured to respond to signals from the input device 82 as a method of operating or positioning the lift gate 10. In turn, the control system 84 can be coupled to the lift gate motor 80. Accordingly, the control system 84 can be configured to respond to input received through the input device 82. In practice, the control system 84 can be implemented or realized as an electronic control module (ECM) of the vehicle 1.

The input device 82 can be manipulated manually, such as when the device 82 is a button, switch, knob, or other such control input device disposed within the vehicle. In some embodiments, the input device 82 can be mounted on or near the lift gate 10. In certain embodiments, the input device 82 can be coupled to the vehicle body 40, such as near or part of the control console, or near the lift gate 10. In some embodiments, the input device 82 can be a remote device configured to interact with the vehicle 1. As one example, a key fob can be used to initiate the opening or closing of a lift gate 10, and can thus be used as an input device 82.

Additionally, the control system 84 can monitor other sources of input, such as the electrodes 18, a secondary sensor system 33, including such as the video system 22, a radar system, an ultrasonic system, the body sensors 17, and the like. Other electronic and mechanical devices, such as pressure switches, accelerometers, or contact sensors can also be used. Such sensors, detectors, electrodes, and systems can be disposed in, on, or near any portion of the vehicle, including the lift gate 10 and glass plate 14, vehicle body 40, and other component, such as the body sensors 17 and video system 22. In some embodiments, near field electrodes and/or capacitive sensing devices can be disposed in or on the vehicle body 40, as depicted in FIG. 1. The control system 84 can be adapted to respond to input from one or more of the sources of input to perform certain tasks or adjust the performance of tasks in progress. In one non-limiting example, the control system 84 can initiate closure of the lift gate 10 from an open position in response to an appropriate control signal or command from the input device 82. In another non-limiting example, the control system 84 can fail to initiate closure of the lift gate 10, despite such a request, should one or more sensors detect the presence of an obstacle or obstruction in the range of motion of the lift gate 10. In yet another non-limiting example, the control system 84 can initiate closure of the lift gate 10 in response to an appropriate control signal or command from the input device 82, and later halt the closure, and/or re-open the lift gate 10 in response to an object detect signal from one or more of the electrodes 18.

In some embodiments, the vehicle 1 comprises a video imaging system. Such a system can include a video sensor 22 or other input device adapted to observe the environment near the vehicle and provide such data to the control system 84. In certain embodiments, the video imaging system can be replaced with different proximity sensing methods and/or devices, such as radar or ultrasonic detection systems. Thus, although reference is made to a video imaging system, different systems can be implemented in different embodiments. The video sensor 22 as depicted can be positioned and altered as suitable to accommodate different proximity sensing systems and devices.

The lift gate 10 can comprise a glass plate 14. The glass plate 14 is preferably transparent. The glass plate 14 can be constructed of a single sheet of glass or a plurality of sheets or layers to form the plate. The layers can be of the same or different types of glass and can include inserts between the layers. As one example, safety glass can be used, which can comprise a sheet of polyvinyl butyral either disposed between layers of glass, or applied to one of the surfaces of a plate of glass. Other types of material can be used for the plate besides glass, such as a resin or polycarbonate thermoplastic, preferably preserving the transparency of the glass.

The glass plate 14 can have four substantially straight edges and can define a generally quadrilateral shape. The exact shape and size can vary from vehicle to vehicle, and preferably conforms to the overall shape of the vehicle 1. The glass plate 14 can have other numbers of edges and shapes as well, such as elliptical, ovoid, or circular.

The glass plate 14 can comprise various devices and mechanisms. In some embodiments, one non-limiting example is a wiper mechanism for clearing water or other objects from the surface of the glass plate 14. In some embodiments, a defrosting system 16 can be present. The defrosting system 16 can aid in clearing condensation, either as frost or fog. Additionally, the defrosting system 16 can assist a user in clearing snow and/or ice from the exterior of the glass plate 14. The defrosting system 16 can comprise one or more elements disposed on the surface of the glass plate 14, or positioned between two or more of the layers. The defrosting system 16 can provide heat to the glass plate 14. One method of providing heat can be to pass an electrical current through a group of resistors disposed on, near, or within the glass plate 14.

Figure 4:
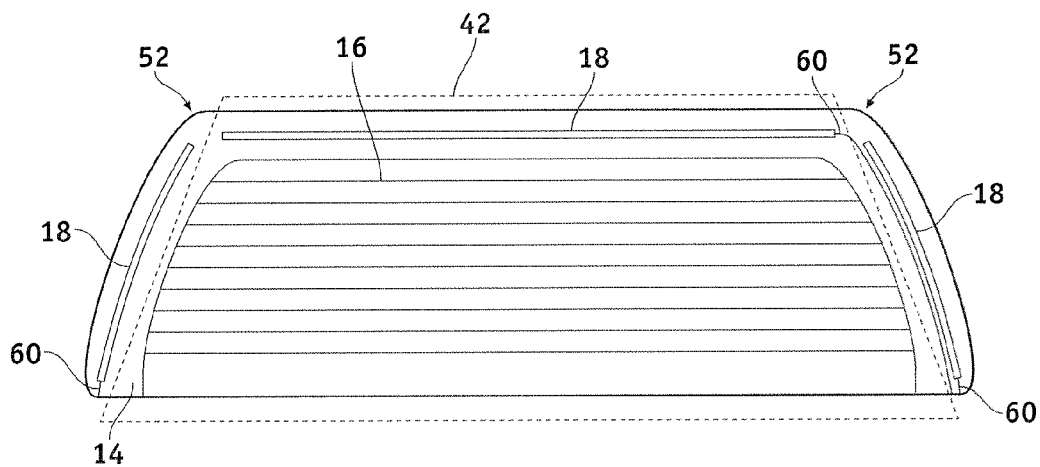
FIG. 4 is a detailed view of the glass plate of FIG. 2.

In some embodiments, the lift gate 10 can have a portal or opening over which the glass plate 14 can be mounted. In certain embodiments, the portal or opening can be smaller than the outer dimensions of the glass plate 14, resulting in the edges of the glass plate 14 on its interior surface extending over and past the inner surface of the opening of the lift gate 10. Accordingly, a portion of the edges of the interior surface of the glass plate 14 can be in contact with a portion of the lift gate 10. With reference to FIG. 4, an outline 42 showing the size of the portal illustrates how, in some embodiments, an occluded portion 52 of the glass plate 14 can occur, where the opening or portal in the lift gate 10 is indicated by the interior of the outline 42.

The glass plate 14 can further comprise one or more near field electrodes 18 that cooperate with the control system 84 to detect the presence of a nearby capacitive body, the construction of which is well-known in the art. In some embodiments, the electrodes 18 can comprise an electromagnetic oscillator, which can produce an electromagnetic field of a known quality and quantity, as well as one or more capacitive sensors adapted to detect perturbations in the field, indicative of the presence of objects. Although reference is made to "near field detection" and "near field electrodes" and the like throughout, such sensors and detectors are contemplated to include other forms of capacitive detection suitable for use in embedding in glass. Thus, although the term "near field" is used, it can be understood to include capacitive sensing and other types of sensing as well. In some embodiments, the electrodes 18 can also comprise a detection circuit or switch adapted to cooperate with the field-creating elements and/or control system to detect the presence of objects. Thus, although the electrode 18 is specified, it can comprise one or more components or elements of a near-field detection system adapted to cooperate with the control system 84 or other features of the vehicle to accomplish the effects described below. Together with any additional components, such as a video imaging system, the electrodes 18 can provide or transmit information or a signal comprising information to the control system 84 regarding the presence of objects which can impede operation of the lift gate 10.

In the illustrated embodiment, three electrodes 18 are present, along the left, right, and top edges of the glass plate 14. In other embodiments, the number and placement of electrodes can vary. As some non-limiting examples, in some embodiments, electrodes can be present along only one side of the glass plate 14, on two opposite sides, on two adjacent sides, three adjacent sides, or on along all four edges of the glass plate 14. In non-quadrilateral embodiments of the glass plate 14, the electrodes 18 can extend partially, substantially, or entirely along various portions of the edge of the glass. As shown in FIG. 4, at least some of the electrodes 18 can be disposed along a portion 52 of the glass plate 14 occluded by the lift gate 10.

Other body sensors 17 (FIG. 1), which can include near field or capacitive sensors, as well as various types of electronic or mechanical sensor types, can also be disposed near the lift entrance 50 to the vehicle 1. Such sensors can cooperate with the control system 84 to assist in determining the presence of obstructions in the path of travel of the lift hatch 10.

The near field electrodes 18, together with the control system 84, can be adapted to detect the presence of capacitive bodies, such as a human or the limbs of a human. The control system 84 can be configured with threshold and detection limit information to interpret input from the electrodes 18 in recognizing the presence of a nearby capacitive body. Additionally, by comparing the input between different electrodes, a determination of approximate or exact location or proximity, and/or size of the detected body can be made. Accordingly, by monitoring the input from the electrodes 18 and determining existence and attributes about detected capacitive bodies, the control system 84 can adjust operation of the lift gate 10 as described above.

With reference to FIG. 4, the glass plate 14 is shown. The glass plate 14 comprises the electrodes 18 and the defrosting system 16. As described above, other systems or components can also be present. The electrodes 18 can comprise or be connected to one or more electrode wires 60. In certain embodiments, the electrodes 18 can comprise one or more wires distinct from the electrode wires 60. The electrode wires 60 can couple the electrodes 18 to the control system 84, a power source, or another component, as appropriate for the vehicle. Preferably, the electrode wires 60 do not overlay or cross another component or portion of a component disposed in or on the glass plate 114. Preferably, the electrode wires 60 extend toward an edge of the glass plate 114 for connection with or to other components, or extension of the electrode wire 60 into the lift gate 10 as appropriate. Additionally, although the term "wire" is used, other materials, devices, or systems suitable for conducting power, such as electrical power, to the electrodes 18 can be used. In some embodiments, non-wire conductors are present. In certain embodiments, the electrode wires can both couple the electrode to a power source as well as function as part of the electrode. Other arrangements are also possible. As shown, the electrode wire 60 for the top electrode 18 can circumvent the right side electrode 18 while extending toward the bottom of the glass plate 114.

Figure 5:
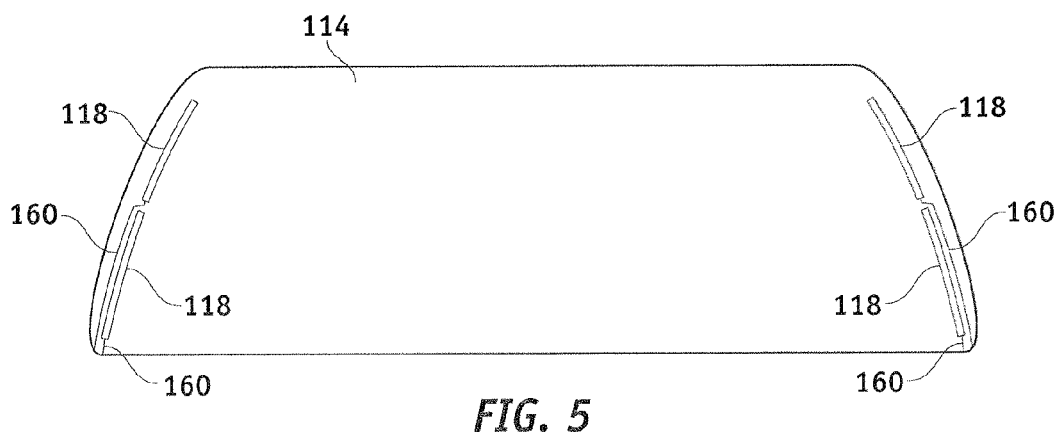
FIG. 5 is front view of a glass plate corresponding to an aspect of an embodiment.

FIG. 5 illustrates an alternative embodiment of the glass plate of FIG. 4. Unless otherwise specified, the components indicated by numerical indicia are similar to those from FIGS. 1-4 above, except that the number has been incremented by 100.

The electrodes 118 can be disposed with more than one electrode 118 along a side of the glass plate 114. Although the electrodes 118 illustrated are on opposite sides of the glass plate 114, other placements and configurations, including that illustrated in FIGS. 1-2 above, can be used as well, with two or more electrodes along an edge of the glass plate 114. Similarly, although only two electrodes 118 on either edge are illustrated in FIG. 5, more or fewer, either disposed in serial as shown, or in parallel with the edge of the glass plate 114 can be used. Any suitable variation or permutation, including mixed single-electrode and multiple-electrode edges can be embodied in a glass plate.

Figures 6, 7, 8:
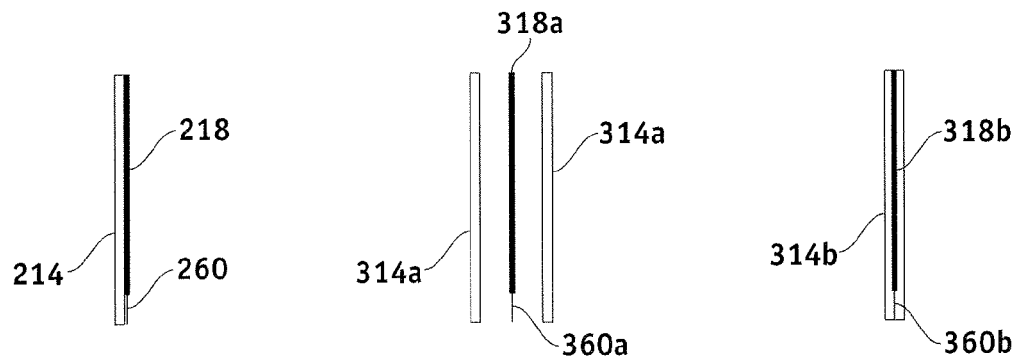
FIG. 6 is a side view of a glass plate corresponding to one aspect of an embodiment.
FIG. 7 is an exploded side view of a multilayered glass plate corresponding to one aspect of an embodiment.
FIG. 8 is an assembled side view of the multilayered glass plate of FIG. 7.

FIG. 6 illustrates a side view of an embodiment of the glass plate of FIG. 4. Unless otherwise specified, the components indicated by numerical indicia are similar to those from FIGS. 1-4 above, except that the number has been incremented by 200.

The electrodes 218 can be silk-screened onto a surface the glass plate 214. Similarly, the electrode wires 260 can also be silk-screened onto the surface of the glass plate 214. The electrodes 218 and wires 260 can be disposed on either the interior or exterior surfaces of the plate 214. In some embodiments, the electrodes 218 can be disposed along at least one edge of the interior surface of the plate 214, so as to be occluded by the lift gate, as described above. Preferably, the electrode wires 260 can be placed on any surface such that they extend along occluded portions, where present.

FIGS. 7 and 8 illustrate a side view of an embodiment of the glass plate of FIG. 4. Unless otherwise specified, the components indicated by numerical indicia are similar to those from FIGS. 1-4 above, except that the number has been incremented by 300.

As shown in FIG. 7, the glass plate can be comprised of layers 314 composed of an appropriate material, as described above. The layers 314 can be of the same or similar materials and are preferably transparent. Although two layers 314 are illustrated, more can also be used. The electrode 318 can be positioned between the layers 314 during construction, molding, or assembly, and preferably is sufficiently thin to not cause distortion to the optical properties of the glass plate when the layers 314 are assembled and/or joined. Although one electrode 318 and electrode wire 360 are referenced, both with regard to FIGS. 7 and 8 as well as other figures, additional electrodes can also be disposed as part of the system. In some embodiments, a layer 314 can be placed, the electrode 318 and electrode wire can be then disposed in appropriate locations on the layer 314, and another layer 314 then disposed atop the assembly.

In some embodiments, the glass plate can be formed as a flat surface and later molded to curve, bend, or otherwise accommodate the desired contour for the vehicle. Other elements, such as the defrosting system can also be disposed between the layers 314. In those embodiments where more than two layers are present, the electrode 318 and wire 360 can be disposed between the same layers as other elements, or the elements can be disposed between two different sets of layers.

With reference to FIG. 8, the glass plate 314 is shown assembled, with the electrode 318 disposed therewithin. The electrode wire 360 can extend to an edge of the glass plate 314 to allow connectivity with external components.

Figure 9:
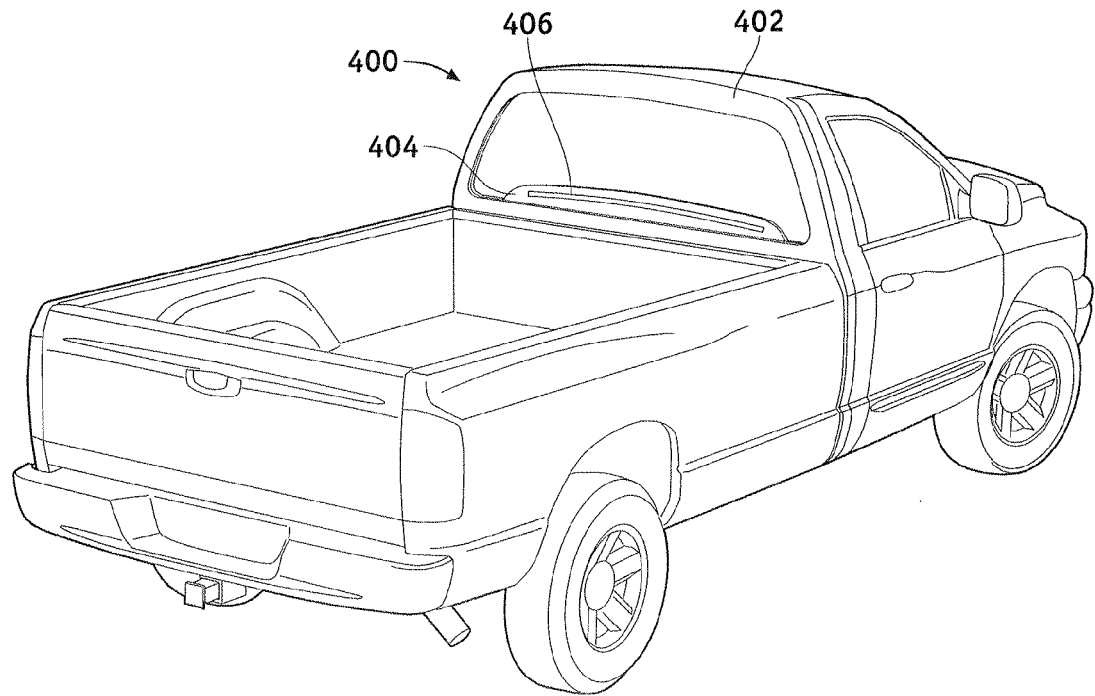
FIG. 9 is a rear view of a vehicle comprising a glass plate corresponding to an embodiment in a first position.
Figure 10:
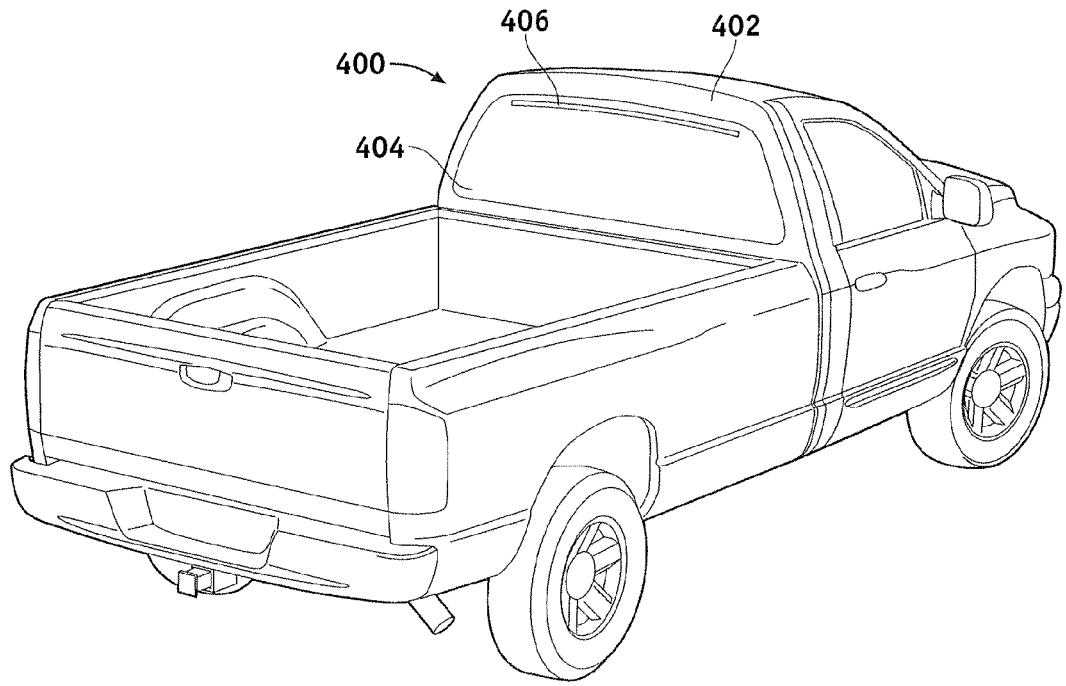
FIG. 10 is a rear view of the vehicle of FIG. 8, wherein the glass plate is in a second position.

FIGS. 9 and 10 illustrate a vehicle comprising a powered glass plate with an electrode. With reference to FIG. 9, the vehicle 400 is shown. The vehicle 400 depicted is a pick-up truck having a powered glass cab rear window, though any vehicle with a section of powered glass can be used. In some embodiments, the powered glass can electronically operated and the window or other glass surface can be selectively disposed within a cavity in the body, frame, door, hatch, gate, or other portion of a vehicle. One non-limiting example can be a passenger window disposed in the door of an automobile. In other embodiments, other positions and applications can be implemented as well, such as an electrode disposed in, on, or near a powered moon roof. In the illustrated embodiment, the vehicle 400 comprises a rear panel 402. The rear panel 402 is coupled to a powered glass plate 404. The powered glass plate 404 can be raised and lowered within the rear panel 402 by any suitable means, such as mechanical or electromechanical manipulation, either through direct interaction or remote. The powered glass plate 404 illustrated in FIG. 9 is shown in the open, or lowered position.

The powered glass plate 404 can comprise a near field electrode 406 adapted to detect nearby obstacles or obstructions. As described above, the electrode 406 can be one or a plurality of electrodes, disposed in any of a variety of locations, including the various edges, such as the top edge in the illustrated embodiment.

FIG. 10 illustrates the vehicle 400 of FIG. 9 with the powered glass plate 404 in a raised position. During operation of the powered glass plate 404, the electrode 406 can provide data to a control system adapted to interpret the information and determine the existence of an object that would impede positioning of the powered glass plate 404. As described above, the control system can be adapted to adjust operation of the powered glass plate 404 in response to detection of such an object.

Figure 11:
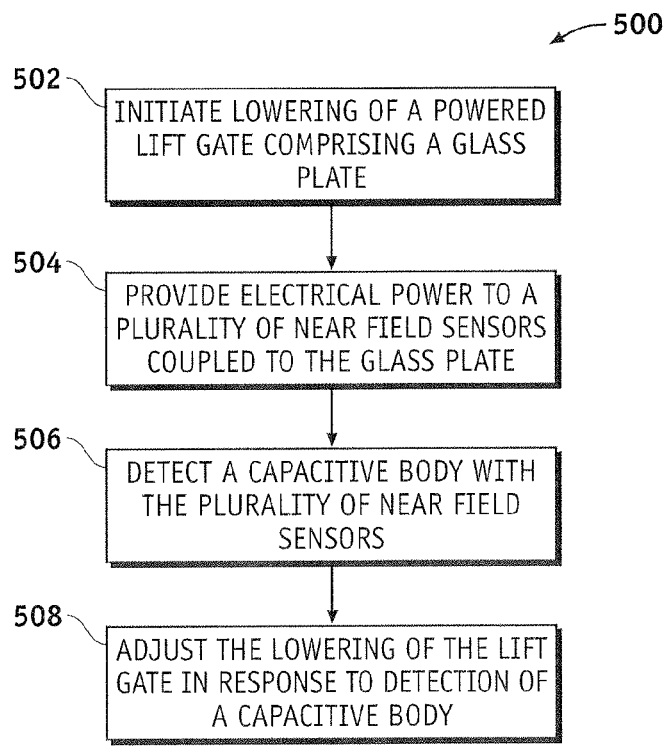
FIG. 11 is a schematic illustration of the steps of a process of operation of a system corresponding to an embodiment.

FIG. 11 illustrates a sequence 500 of steps by which a lift gate comprising a glass plate can be lowered with near-field object detection sensors disposed in or on the glass plate.

The various tasks performed in connection with sequence 500 may be performed by software, hardware, firmware, or any combination thereof. For illustrative purposes, the following description of sequence 500 may refer to elements mentioned above in connection with FIGS. 1-10. In practice, portions of sequence 500 may be performed by different elements of the described system, e.g., electrodes 18, input device 82, control system 84, and/or lift gate motor 80. It should be appreciated that sequence 500 can include any number of additional or alternative tasks, the tasks shown in FIG. 11 need not be performed in the illustrated order, and sequence 500 may be incorporated into a more comprehensive procedure or process having additional functionality not described in detail herein.

An input device can be used to instigate a request to alter the position of a powered lift gate. In one embodiment, the alteration of position can comprise the closure of the lift gate. A control system can initiate 502 the lowering of the lift gate. Prior to the lowering, or substantially simultaneously therewith, the control system can additionally provide 504 power, including electrical power, to a plurality of near field sensors coupled to the glass plate. The sensors can comprise electrodes configured as described above.

Following initiation 502 of lowering of the lift gate, the sensors can detect 506 a capacitive body, optionally including detection of its approximate size and location. In response to detection 506 by the sensors, the control system can adjust 508 the lowering of the lift gate. Such adjustment can include slowing the rate of closure, halting closure, and returning the lift gate to its open position, among other responses. Audible or visual feedback indicating the adjustment 508 can also be performed.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A near-field detection system for detecting an object, the system comprising:
a glass plate comprising at least two layers and having a first edge;
a first electrode integrally disposed between the at least two layers of the glass plate and along the first edge to detect the presence of the object proximate to the glass plate; and
a second electrode integrally disposed between the at least two layers of the glass plate, the second electrode adapted to detect the presence of an object in near proximity to the glass plate,
wherein the near-field detection system compares an output of the first electrode and the second electrode to determine a location of the object and the first and second electrodes are adapted to transmit a signal in response to the presence of the object.

2. The near-field detection system of claim 1, wherein the first electrode extends substantially entirely along the first edge.

3. The near-field detection system of claim 1, wherein the second electrode is disposed along the first edge of the glass plate.

4. The near-field detection system of claim 1, wherein the second electrode is disposed along a second edge of the glass plate.

5. The near-field detection system of claim 4, wherein the first edge and the second edge are adjacent.

6. The near-field detection system of claim 4, wherein the first edge is opposite the second edge.

7. The near-field detection system of claim 1, wherein the glass plate is disposed in a lift gate of a vehicle.

8. A method of lowering a lift gate comprising a glass plate having at least two layers, the method comprising:
detecting an object with a plurality of near-field sensors integrally disposed between the at least two layers of the glass plate;
comparing an output of the plurality of near-field sensors to determine a location of the object; and adjusting movement of the lift gate in response to the detection of the object.

9. The method of claim 8, wherein providing electrical power to a plurality of near-field sensors comprises providing electrical power to two or more electrodes adapted to produce an output signal and detecting an object with the near-field sensors comprises comparing the output signal between or among the two or more electrodes.

10. The method of claim 8, wherein adjusting movement of the lift gate comprises stopping the lift gate.

11. The method of claim 8, wherein adjusting movement of the lift gate comprises re-opening the lift gate.

12. A near field detection system comprising:
a vehicle lift gate comprising:
  a glass plate comprising at least two layers; and
  a plurality of electrodes integrally formed between the at least two layers of the glass plate, the plurality of electrodes adapted to detect an object in near proximity to the glass plate;
a lift gate motor coupled to the lift gate and adapted to adjust the position of the vehicle lift gate; and
a control system coupled to the electrode and to the lift gate motor, the control system being adapted to operate the lift gate motor, wherein the control system compares an output of the plurality of electrodes to determine a location of the object.

13. The near-field detection system of claim 12, wherein the control system is adapted to open the vehicle lift gate in response to the electrode detecting an object in near proximity to the glass plate.

14. The near-field detection system of claim 12, wherein the control system is adapted to close the vehicle lift gate.

15. The near-field detection system of claim 14, wherein the control system is adapted to cease closing the vehicle lift gate in response to an object detect signal from the electrode.

16. The near-field detection system of claim 12, further comprising a video imaging system coupled to the control system, the control system adapted to cease closing the vehicle lift gate in response to an object detect signal from the video imaging system.

* * * * *